Dec. 20, 1960  E. E. HUXLEY ET AL  2,965,472
MANUFACTURE OF TRIPLE SUPERPHOSPHATE
Filed June 6, 1957
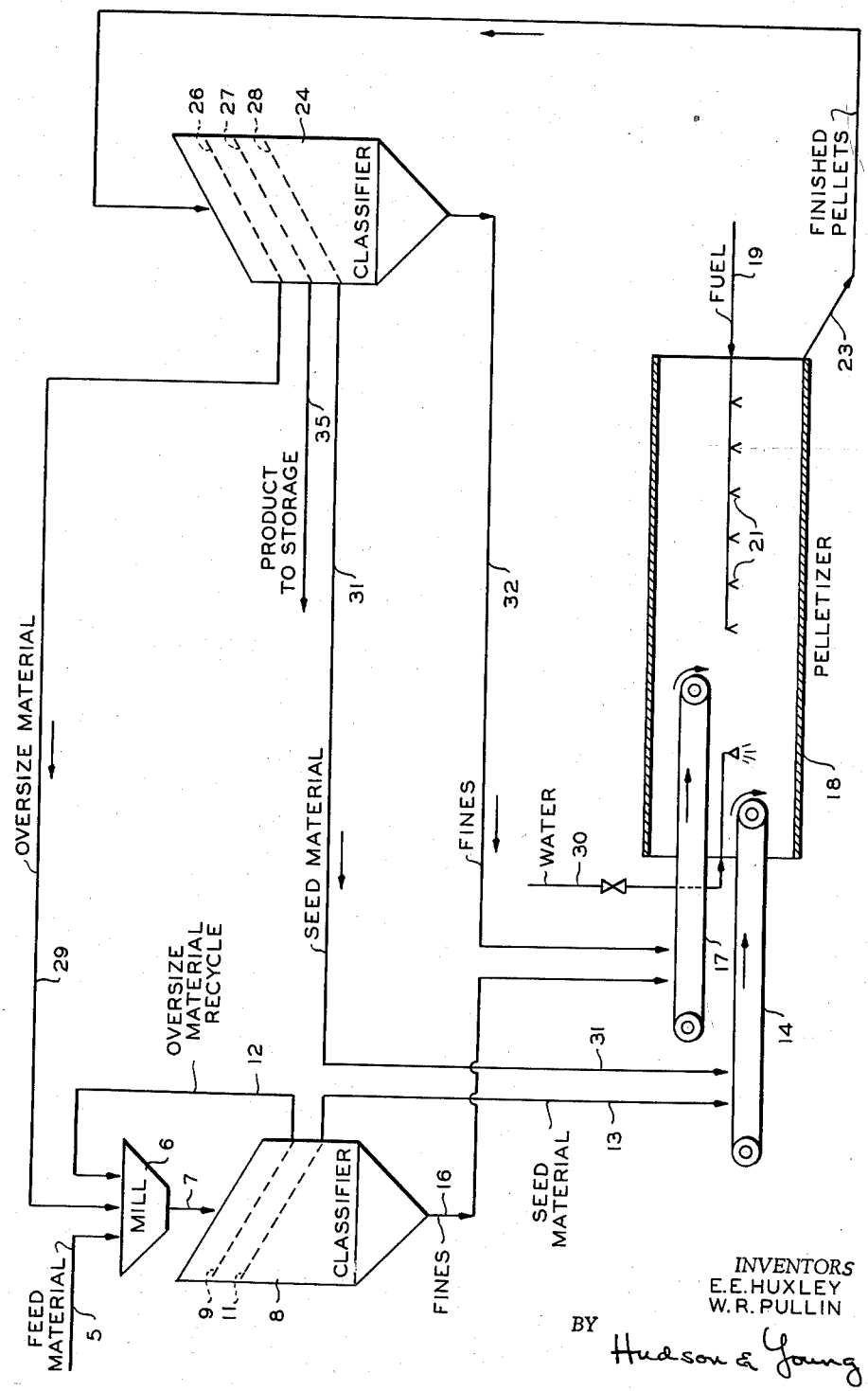
INVENTORS
E. E. HUXLEY
W. R. PULLIN
BY
Hudson & Young
ATTORNEYS

//  2,965,472
MANUFACTURE OF TRIPLE SUPERPHOSPHATE

Edward E. Huxley and William R. Pullin, Pasadena, Tex., assignors to Phillips Petroleum Company, a corporation of Delaware Filed June 6, 1957, Ser. No. 663,994

1 Claim. (Cl. 71—64)

This invention relates to the manufacture of triple superphosphate. In one aspect, it relates to a process for pelletizing or granulating triple superphosphate. In another aspect it relates to a process for classifying and pelleting triple superphosphate fertilizer made by the continuous process from phosphate rock and phosphoric acid.

In the past, trends in mechanization in the manufacture of triple superphosphate have lead to various continuous processes. These recent trends have been motivated by ever increasing demands for a triple superphosphate product having a maximum amount of available phosphorous pentoxide and good physical properties.

Generally, the triple superphosphate product is obtained by crushing or milling the initially produced fertilizer and then agglomerating the coarse particles in the presence of water and triple superphosphate fines or classifier dust. After agglomeration, the encrusted fertilizer particles or pellets are then dried. However, this agglomerating and drying procedure varies in many instances so that the triple superphosphate pellets do not have good physical properties. Rather, the triple superphosphate pellets often have rough, porous surfaces and the pellets are somewhat knobby in appearance and have a low crushing strength which increases their tendency to break up into fines on storage or subsequent mechanical handling. Moreover, such a product is unsuited for use as a fertilizer because of the difficulty in feeding it through even the highly specialized farm equipment in use today. Such feeding difficulties cause uneven coverage of the land and render the use of such fertilizer less economical.

Accordingly, an object of this invention is to improve the manufacture of triple superphosphate. Another object is to provide an improved process for producing triple superphosphate granules or pellets characterized by uniform size, generally round or spherical shape, smooth and porous surfaces, desirable crushing strength, etc. A further object is to provide an improved processs for pelleting or granulating triple superphosphate in a form which will not cause feeding difficulties in farm machinery and which product has a high bulk density allowing savings in packaging costs. Further objects and advantages of this invention will become apparent to those skilled in the art from the following discussion, appended claim and accompanying drawing.

Triple superphosphate (45 to 50% phosphorus pentoxide), sometimes known as double, treble, or concentrated superphosphate, is made by an acidulation of phosphate rock with phosphoric acid according to the equation:

$$(CaF)Ca_4(PO_4)_3 + 7H_3PO_4 + 5H_2O$$
$$\rightarrow 5CaH_4(PO_4)_2H_2O + HF$$

The resulting triple superphosphate is usually conveyed from the reactor or mixer by a reaction belt to a disintegrator where it is broken up into small pieces. The discharge from the disintegrator is then usually passed to storage, with or without preliminarily drying the same. After curing in storage, the triple superphosphate is then generally crushed or milled and classified. The coarse triple superphosphate is then agglomerated in the presence of water and fines or dust which encrusts the coarser particles. After agglomeration, the encrusted particles are then dried and classified. As pointed out hereinbefore, this agglomerating or pelleting procedure is often unsatisfactory in that pellets are produced having poor physical properties. Broadly, we have discovered that triple superphosphate pellets having desirable physical properties can be produced by an improved pelletizing or agglomerating process which insures the presence of an essential amount of fines material during the drying operation. In order to facilitate a fuller understanding of our invention, reference will now be made to the drawing which is a diagrammatic representation of a classifying and pelletizing system for treating triple superphosphate to produce the desired product according to the present invention.

Triple superphosphate feed material is fed via line 5 to a crushing device or mill 6. This feed material can be undried triple superphosphate which has been cured in a pile for about 21 days, or triple superphosphate which has been cured about 21 days and then dried, or triple superphosphate which has been taken from the reaction belt, disintegrated, and dried (this feed material being known as quick cured triple superphosphate). We prefer to use as feed material that triple superphosphate which is taken from the reaction belt and cured about 21 days in a pile without drying the same; this type of feed is generally the most economical to use because the expense of drying the product prior to pelletizing is eliminated.

The comminuted discharge from mill 6 is conveyed via line 7 to a classifier 8 where it is classified or screened. Classifier 8 is preferably provided with a pair of vibrating screens 9, 11. Any over-size material that remains on the top screen 9 can be returned via line 12 to the mill 6 for additional milling or crushing. The portion of the feed material which remains on the lower screen 11 represents coarse or seed material and this is conveyed via line 13 to a conveyor belt 14 or the like, hereinafter referred to as the seed material belt. That portion of the feed material that passes through both screens 9 and 11 falls to the bottom portion of the classifier 8 and is discharged therefrom via line 16 onto a conveyor belt 17 or the like, hereinafter referred to as the fines belt.

Generally, the size of the top screen 9 will be in the range between about 4 and 10 mesh, preferably, between about 6 and 10 mesh, and the lower screen 11 will be in the range between about 6 and 20 mesh, preferably between about 10 and 14 mesh. Alternatively, the feed material which passes through the upper screen 9 can be air-classified instead of screen-classified. The seed material will generally amount to about 50 to 70 weight percent of the feed material and will generally have a size about in the range between −6 mesh to +20 mesh; the remaining fines material will generally amount to about 20 to 50 weight percent of the feed material and will have a size in the range between about −14 and −20 mesh. (As used herein and in the appended claim, the mesh designation refers to the Tyler standard sieve system.)

The coarse triple superphosphate material is discharged from the seed material belt 14 into one end of a rotary drum or pelletizer 18. The pelletizer 18 is cylindrical in shape and is rotatable by suitable known means, such as automobile tires, bull gears, or the like (not shown). As an example, the pelletizer has an 8 foot d'ameter and is about 30 to 48 feet in length. Immediately after being discharged from the seed material belt 14, the seed material is allowed to roll in the pelletizer and can then be sprayed with a controlled amount of water. The wet bed of seed material is allowed to roll a short distance from the point at which the seed material was introduced, and fines material is then discharged from fines belt 17 on to the top of the rotating bed of wet seed material. The fines material can be added at a single point or at a plurality of points using a plurality of fines material belts.

At a point somewhat removed from the point at which the fines material was initially added to the bed of wet seed material, the bed is heated throughout the remainder of the pelletizer length by suitable means, such as fuel line 19 having burners 21; alternatively, hot gases can be introduced through one end of the pelletizer and discharged from the other end, or suitable heat means may be provided exterior to the pelletizer, such as a steam jacket. The bed temperature is generally in the range between about 125 and 200° F., preferably between about 125 and 150° F. The heated rolling bed then forms a smooth round pellet or granule. The finished dry pelleted product is discharged via line 23 to storage or suitable bagging equipment.

Alternatively, the product can be conveyed to a classifying unit 24 having a plurality of vibrating screens 26, 27, and 28 by which the product may be classified to specification sizes. By way of illustration, top screen 26 can have a mesh of about −6; intermediate screen 27 a mesh of about −12; and lower screen 28 a mesh of about −14. Any material which remains on the top screen 26, designated oversize material, can be conveyed via line 29 to mill 6. The material which remains on lower screen 28 can be conveyed via line 31 to the seed material belt 14. The material which passes through the lower screen 28 and collects in the bottom portion of classifier 24 can be recycled via line 32 to the fines material belt 17.

The material remaining on screen 27 in classifier 24 represents product or specification size triple superphosphate and generally will have a size in the range between about −6 and +12 mesh. The pelletized product has a smooth and porous surface, a uniform and generally round or spherical size, desirable crushing strength, e.g., 12 to 16 p.s.i., and will contain about 3 to 5 weight percent of moisture. This pelleted product has very desirable mechanical handling characteristics and can be bagged with little tendency to form fines during storage or mechanical handling. These pellets are not too hard and are disintegrated almost at once upon being placed in water, making the phosphatic nutrients readily available to plants when the fertilizer material is applied to the soil.

The amount of water that is sprayed on the seed material in the pelletizer 18 will depend on several factors, such as the moisture content of the feed material, and can be controlled by line 30. Generally, the moisture content is adjusted so that it is not lower than about 8 weight percent, the upper limit being that amount which will sufficiently wet the seed material without causing the particles to stick together in the absence of fines during the agglomerating step. Generally, this upper limit will be about 10 weight percent.

During the drying step, the temperature is controlled so that the finished dried pellets contain about 3 to 5, preferably 3 to 4, weight percent moisture, which moisture will lessen the tendency of the pellets to break up into fines during storage or handling.

As pointed out hereinbefore, it is essential and necessarily critical in the practice of this invention to insure the presence of a sufficient amount of fines during the drying step. This amount will depend on several factors, such as the size of the fines, the temperature of the drying step, the moisture content of the seed material, etc. Accordingly, we prefer to broadly define the amount of fines functionally rather than in actual numerical limits, the amount of fines to be used being that which will take up moisture exuded from the pellets during the drying step and which will coat the pellets to give them a smooth, porous surface. To insure the presence of sufficient fines during the drying step, we prefer to use an amount in excess of that required. Thus, the discharge from the pelletizer 18 will comprise a small amount of fines in addition to finished pellets. Generally, satisfactory results will be obtained with about 20 to 40 weight percent of fines, preferably the lower limit.

Although our improved pelletizing process is illustrated using the same rotary drum 18 for the purposes of agglomerating and drying the fertilizer material, it is to be understood that separate rotary drums can be used for these operations, that is, a first drum can be used to agglomerate the wet seed material with fines and a second drum used to dry the agglomerated material.

The advantages of our invention have been realized by reducing our invention to practice on a pilot scale using a rotary drum measuring 30 inches in diameter and 6 feet in length as a unitary agglomerating and drying unit.

Various modifications and advantages of our invention will become apparent to those skilled in the art from the foregoing discussion and drawing. However, it is to be understood that the foregoing merely represents preferred embodiments of our invention and do not unduly limit the same.

We claim:

A process for pelleting cured triple superphosphate so as to produce improved pellets of generally round shape, generally smooth surface, and substantially uniform size, suitable for mechanical spreading by farm machinery, comprising the steps of using a cured triple superphosphate as a feed material to said process, passing said feed material to a milling zone and comminuting said feed material therein, passing said comminuted feed material to a two-stage classification zone consisting essentially of a first and second screening means disposed in series therein, recycling a first oversize material collecting on said first screening means to said milling zone, the portion of said feed material passing through said first screening means having a particle size smaller than 6 to 10 mesh, passing oversize feed material collecting on said second screening means as a first seed material to the upper end of a rotating cylindrical pelleting zone via a first conveying means, the first feed material to said pelleting zone having a particle size between 6 and 14 mesh, a second classification zone for the pelleted product of said process having a third, fourth and fifth screening means disposed in series therein, the portion of said pellets collecting on said third screening means in said second classification zone being returned as a second oversize material to said milling zone, the portion of said pellets passing through said third screening means having a particle size less than 6 mesh, the portion of said pellets collecting on said fourth screening means in said second classification zone being passed to storage as product and having a particle size between 6 and 12 mesh, the portion of said pellets passing through said fourth screening means having a particle size less than 12 mesh, the portion of said pellets collecting on said fifth screening means in said second classification zone being passed as a second seed material having a particle size between 12 and 14 mesh to said first conveying means and admixing with said first seed material thereon, the admixed first and second seed materials containing less than 8 percent by weight of water entering the upper end of said pelleting zone, then spraying water on the surface of a tumbling bed of said admixed seed material in said pelleting zone until the water content averages from 8 to 10 percent by weight as the only water content addition step, the portion of said pellets passing through said fifth screening means in said second classification zone and having a particle size of less than 14 mesh being passed to said pelleting zone via a second conveying means and being introduced into said pelleting zone downstream of said spraying water, the portion of said feed material passing through said second screening means in said first classification zone and having a particle size of less than 14 mesh being admixed with said pellets on said second conveying means prior to introduction into said pelleting zone, the admixed fines on said second conveying means comprising 20–40 percent by weight and having a particle size smaller than 14 mesh, then tumbling said bed in said pelleting zone while heating said bed in a range between 125–200° F. until the moisture content of the resulting pellets is between 3 and 5 percent by weight of said pellets, and passing said pelleted triple superphosphate to said second classification zone for separating out said pelleted cured triple superphosphate as product.

References Cited in the file of this patent

UNITED STATES PATENTS

| | | |
|---|---|---|
| 1,957,314 | Billings et al. | May 1, 1934 |
| 2,228,704 | Offutt | Jan. 14, 1941 |
| 2,232,145 | Shoeld | Feb. 18, 1941 |
| 2,287,759 | Hardesty et al. | June 23, 1942 |
| 2,448,126 | Shoeld | Aug. 31, 1948 |
| 2,631,084 | Robinson | Mar. 10, 1953 |
| 2,680,680 | Coleman | June 8, 1954 |